US012106355B2

(12) United States Patent
Phillips et al.

(10) Patent No.: US 12,106,355 B2
(45) Date of Patent: *Oct. 1, 2024

(54) AUTOMATED SYSTEM AND METHOD FOR STAGING PRODUCTS AT PICKUP LOCATIONS

(71) Applicant: Capital One Services, LLC, McLean, VA (US)

(72) Inventors: Jeremy Phillips, Brooklyn, NY (US); Andrew Grossman, White Plains, NY (US); Ari Horowitz, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,150

(22) Filed: Sep. 1, 2022

(65) Prior Publication Data

US 2023/0135820 A1    May 4, 2023

Related U.S. Application Data

(63) Continuation of application No. 17/168,821, filed on Feb. 5, 2021, now Pat. No. 11,461,833.

(51) Int. Cl.
*G06Q 30/0601* (2023.01)
*G06Q 10/0836* (2023.01)
*G06Q 10/087* (2023.01)

(52) U.S. Cl.
CPC ..... *G06Q 30/0635* (2013.01); *G06Q 10/0836* (2013.01); *G06Q 10/087* (2013.01); *G06Q 30/0633* (2013.01); *G06Q 30/0639* (2013.01)

(58) Field of Classification Search
CPC ........ G06Q 10/08–087; G06Q 30/0601–0643; G07C 9/00174; G07C 9/00896;
(Continued)

(56) References Cited

U.S. PATENT DOCUMENTS 5,890,136 A    3/1999  Kipp
6,882,269 B2   4/2005  Moreno
(Continued)

OTHER PUBLICATIONS http://parcelpending.com. Recovered from www.Archive.org. Dated Feb. 5, 2015-Feb. 6, 2015. https://web.archive.org/web/20150205232821/http://parcelpending.com:80/ (Year: 2015).*
(Continued)

*Primary Examiner* — William J Allen
(74) *Attorney, Agent, or Firm* — HUNTON ANDREWS KURTH LLP (57) ABSTRACT

In an automated product delivery method a request for delivery of a product is received from a user device. One or more product delivery options are determined and transmitted to the user device and a selected product delivery option is received from the user device. The product is provided to the selected delivery location in advance of the selected delivery time window. A delivery processing server receives user device location information and determines an estimated arrival time of the user at the delivery location. At the estimated arrival time, the product is securely staged for pickup by the user. The delivery processing server receives user validation information, and responsive to validation of the user information, transmits to the delivery location processing device, an instruction to allow access to the product by the user, and access to the product by the user is allowed.

15 Claims, 3 Drawing Sheets

(58) Field of Classification Search
CPC ........ G07C 9/00904; G07C 2009/0092; G07F 17/12; G07F 17/13; A47F 10/00; A47F 10/02; A47F 2010/025; A47F 2010/005
See application file for complete search history.

(56) References Cited

U.S. PATENT DOCUMENTS

| | | | |
|---|---|---|---|
| 7,406,437 | B2 | 7/2008 | Goodwin, III |
| 7,693,745 | B1 | 4/2010 | Pomerantz et al. |
| 9,619,955 | B2 | 4/2017 | Eichenblatt |
| 10,733,681 | B2 | 8/2020 | Boss et al. |
| 2001/0034665 | A1 | 10/2001 | Kinory et al. |
| 2001/0042024 | A1 | 11/2001 | Rogers |
| 2002/0010661 | A1 | 1/2002 | Waddington et al. |
| 2002/0016747 | A1 | 2/2002 | Razumov |
| 2002/0099620 | A1 | 7/2002 | Ohta et al. |
| 2002/0107820 | A1 | 8/2002 | Huxter |
| 2003/0036977 | A1 | 2/2003 | Morse |
| 2003/0176945 | A1 | 9/2003 | Tozuka et al. |
| 2003/0177072 | A1 | 9/2003 | Bared |
| 2004/0054607 | A1 | 3/2004 | Waddington et al. |
| 2004/0059614 | A1 | 3/2004 | Brown et al. |
| 2006/0206395 | A1 | 9/2006 | Vallabh |
| 2013/0346237 | A1 | 12/2013 | Rademaker |
| 2014/0067618 | A1 | 3/2014 | Zhang et al. |
| 2014/0188750 | A1 | 7/2014 | Seiler |
| 2015/0088677 | A1 | 3/2015 | Reed et al. |
| 2015/0186840 | A1 | 7/2015 | Torres et al. |
| 2015/0194023 | A1 | 7/2015 | Brackenridge et al. |
| 2017/0213173 | A1 | 7/2017 | Dong |
| 2017/0316656 | A1 | 11/2017 | Chaubard et al. |
| 2017/0323262 | A1 | 11/2017 | Hillis |
| 2018/0082353 | A1 | 3/2018 | Mattingly et al. |
| 2020/0262338 | A1 | 8/2020 | Salter et al. |
| 2020/0349796 | A1* | 11/2020 | Gokcebay .......... G07C 9/00896 |

OTHER PUBLICATIONS

Kioskmarkeplace.com—Networld Media Group: How BOPIS lockers enhance the click-and-and-collect shopping experience Weblog post. Newstex Trade & Industry Blogs, Newstex. Aug. 7, 2019. (Year: 2019).

* cited by examiner

AUTOMATED SYSTEM AND METHOD FOR STAGING PRODUCTS AT PICKUP LOCATIONS

FIELD OF THE INVENTION

This disclosure relates generally to automated product delivery, and, more particularly, to the automated staging of purchased products for pickup by the user of a mobile interface device.

BACKGROUND OF THE INVENTION

On-line customers often request that a purchased product be made available for pick up at a particular retail location. The merchant from whom the product is purchased must make sure that the product can be provided at the desired location and at a time that is acceptable to the customer. This may involve making sure that the product is already available or can be prepared at the desired location or that it can be shipped to that location within the promised time frame. The retail location must then assure that the purchased product is set aside for the purchaser to pick up. If a large number of products are regularly ordered in this manner, retail locations may run into space and logistic problems preparing and staging the purchased products. There often may be many nearly-identical items waiting for pickup and it may be left to a retail associate—or worse, the customer— to sort through those items to find the right package. In addition to potentially long wait times and other inconveniences, there is a significant potential for error, resulting in customers getting products intended for other customers.

SUMMARY OF THE INVENTION

An illustrative aspect of the invention provides a product delivery method comprising receiving, by an order processing server of a merchant from a user device associated with a user, a request for delivery of a product by the merchant. The order processing device determines one or more product delivery options, each including a delivery location and an availability window. The ordering processor transmits the product delivery options to the user device and receives from the user device a selected product delivery option including a delivery location and a delivery time window. The method further comprises providing the product to the delivery location by the merchant in advance of the delivery time window. A delivery processing server receives at periodic intervals user device location information and determines and periodically updates an estimated arrival time of the user at the delivery location. At the estimated arrival time, the product is securely staged at the delivery location for pickup by the user. The method still further includes receiving, by the delivery processing server from at least one of the user device and a delivery location processing device, user validation information. Responsive to validation of the user validation information, the delivery processing server transmits to the delivery location processing device, an instruction to allow access to the product by the user, and access to the product by the user is allowed.

Another aspect of the invention provides a product delivery system comprising a plurality of delivery location outlets associated with a merchant, each outlet having a product delivery arrangement configured for securely staging an ordered product for pickup by an ordering user at an estimated arrival time. The system further comprises an ordering server in selective data communication with the product delivery arrangement of each delivery location outlet and a user device associated with a user. The ordering server is configured to receive from the user device a request for delivery of the ordered product of the merchant and to transmit a product delivery order including identification of the ordered product, a selected delivery location outlet, and a delivery time interval. The system further comprises a location monitoring server configured to obtain location information for the user device and determine a time varying estimated location of the user device using the location information. The system still further comprises a delivery server in selective data communication with the ordering server, the location monitoring server, the product delivery arrangement of each delivery location outlet, and the user device. The delivery server is configured to receive user device location information from the location monitoring server, determine and periodically update an estimated arrival time of the user at the selected delivery location, and transmit the estimated arrival time to the product delivery arrangement of the selected delivery location outlet.

Another aspect of the invention provides a mobile user ordering device comprising a data processor, a communication interface, a user interface, and a memory. The communication interface is in communication with the data processor and is configured for selective communication with a product ordering server, a location monitoring server, and a product delivery server via a network. The user interface comprises a data entry mechanism and a visual display. The memory is accessible by the data processor and contains a product ordering application and a location services application. The product ordering application has instructions to be carried out by the data processor configured to receive user input via the user interface to select the ordered product and transmit via the communications interface a product delivery request to the product ordering server. The product delivery request identifies an ordered product. The instructions are further configured to receive a request response from the product ordering server, the response including a plurality of delivery options, to display the plurality of delivery options to the user, to receive user input via the user interface to identify the selected delivery location and the delivery time interval, and to transmit a selected delivery location and delivery time interval to the product ordering server. The instructions are also configured to communicate with at least one of the set consisting of the delivery server and a delivery location processing device associated with the selected delivery location upon the mobile user ordering device arriving at the selected delivery location within the delivery time interval. The location services application has instructions to generate location information usable to determine a real time location of the mobile user ordering device and to transmit the location information to the location monitoring server via the communication interface.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods and systems for staging a product at a pick-up location specified by a purchaser in a network transaction. In typical embodiments of the invention, a customer uses a mobile or other user device to submit an order to a merchant for a particular item. The merchant's order processing server connects to a database to see if the item is available at (or can be sent to) a preferred store or an outlet near the customer. Pick-up options may be presented to the customer and the customer selects a location and a time interval for pick-up. As the time interval approaches, the user is prompted to activate a location service on the user's mobile device so that the merchant can determine the user's location. This allows the merchant to assure that the ordered product is immediately available when the customer arrives to pick it up. In particular embodiments, the merchant may use a delivery arrangement that presents the ordered item to the customer upon arrival, but prevents access to the product until completion of a transaction via the customer's mobile device.

Figure 1:
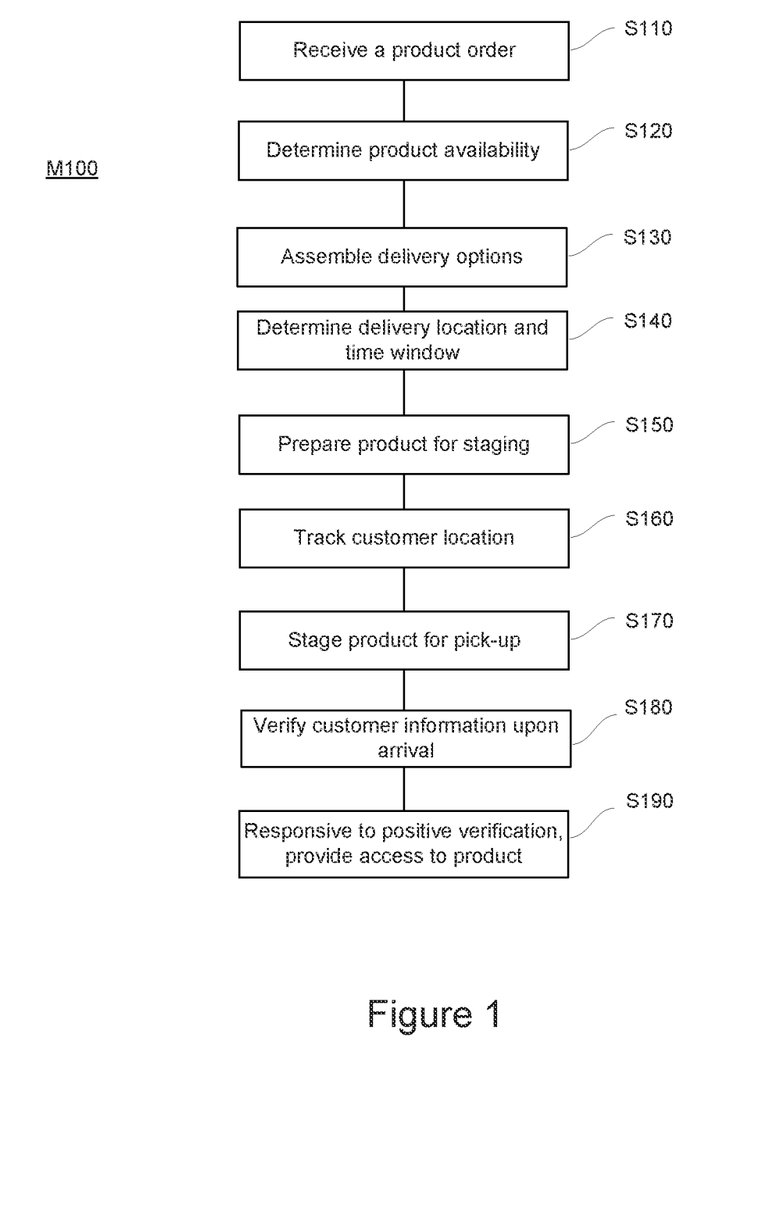
FIG. 1 is a flow chart of actions in a product delivery method according to an embodiment of the invention.

FIG. 1 illustrates a basic method M100 of staging a product for delivery by a merchant to an ordering customer according to an exemplary embodiment of the invention. At S110 of the method M100, the merchant receives a product order from the customer. In typical embodiments, the product order may be received by an order processing server from a user device of the customer. The user device may be associated with an account of the customer, the account being administered by the merchant or a financial or other entity. The product order may be received as a separate, standalone order request or may be made as part of an on-line interactive session between the user device and the order processing server. In particular embodiments, the product order may be transmitted by the user device using an ordering application resident on the user device. The product order includes information identifying the product. It may also include information identifying the user device, the customer, and/or a customer account. In some embodiments, the initial order may also include the location of the customer and/or a preferred delivery location.

After receiving the product order, the order processing server determines the availability of the product at S120. This may include reviewing information obtained from a product availability database to determine availability at one or more levels of the merchant's product delivery pipeline. For example, the order processing server may first determine the availability of the product at a specific location identified in the product order or in other merchant outlets in the same geographic area. In some cases, this may require communication between the order processing server and potential delivery locations to determine whether the product is actually on-site at these locations. The server may also check availability at other outlets or storage facilities (e.g., warehouses or distribution centers), and may make a determination as to whether the product can be shipped to the preferred location or area.

At S130, the order processing server may assemble a set of delivery options based on the availability information it has gathered. These options may include various specific locations and time intervals, which have different levels of desirability from the perspective of the customer and the merchant. The potential delivery locations may include any of various types of delivery outlets including retail stores of the merchant, retail stores of other companies with whom the merchant has a delivery agreement, and manual or automated delivery kiosks. In the case of some products (e.g., financial products), the delivery location may actually be capable of generating or preparing the product on-site.

At S140, the order processing server determines a delivery location and a time window for pick-up. In some embodiments, this may include determining an optimum delivery option from the set of delivery options determined at S130. The delivery option may be selected by the order processing server based on an optimum combination of time and cost. Alternatively, the order processing server may transmit a list of some or all of the delivery options to the user device and receive a selection from the user. At S150, the merchant prepares the product for staging. Depending on the nature of the product, this may include manufacturing or otherwise producing the product, packaging the product modifying the product per customer direction, shipping the product to the selected delivery location, and/or placing the product in a pre-staging area at the delivery location. In some embodiments, staging preparation may include placement of the product in an automated staging arrangement at the delivery location.

At S160, the merchant may track the location of the customer. This will typically be accomplished by a location tracking server receiving information provided by a location service application on the customer's user device. In some embodiments, the location tracking server may transmit a request to the user to activate the location service as the scheduled time window for pick-up approaches. Upon activation by the user, the location tracking server can determine the location of the customer relative to the pick-up location. In some embodiments, the user may be prompted to activate the location service when they set out for the pick-up location. At the same time, they may be prompted to provide additional information that could be used to better estimate their arrival time. This could include, for example, the mode of transportation or route the customer intends to use or whether the customer intends to make stops along the way.

At S170, a delivery server may use the customer location information from the tracking server determine an estimated time for the customer to arrive (ETA) at the pick-up location. In some cases, the delivery server need only estimate the customer's earliest possible arrival time. The ETA determination can be made based on the current location of the customer and the expected travel time to the pick-up location. Estimates may be prepared using any additional information provided by the user. In some cases, particularly where the user fails to activate the location service, the user may be prompted to provide such additional information or may be asked himself to provide an estimated arrival time.

In some cases, customers may leave their location service on at all times. In these cases, the delivery server may be able to gather a great deal of data regarding the habits and typical movements of a customer. This may allow the delivery server to make a determination that a customer is headed to the pick-up location and to determine the customer's ETA without receiving an explicit indication from the user device.

Once an ETA has been estimated, the delivery server transmits it to the delivery location. At S170, the merchant prepares and positions (i.e., "stages") the product for pick-up by the customer. This action may be taken at or just before the expected time of arrival of the customer at the delivery location. In some embodiments, the action of staging the product will be accomplished by manually taking the product from a pre-staging location and placing it at a delivery pick-up location within the merchant outlet. In other embodiments, the product may be positioned for viewing and pick-up by an automated staging arrangement.

Upon arrival of the customer at the pick-up location, the merchant verifies customer identification at S180. In some embodiments, this may be done manually by store or delivery personnel and may include visually checking an identification or account card. In embodiments using an automated staging arrangement, verification may require the presence of the user device or an account card. In these cases, the staging arrangement may include a device for scanning or communicating (e.g., though near field communication) with the user device or account card and for transmitting the information to a central delivery server for verification. Upon positive verification of the customer's identity and authorization, the merchant provides the customer access to the product. In in-store scenarios, this may simply mean handing the product to the customer or allowing the customer to enter an area to pick up the product. In embodiments using an automated staging arrangement, the arrangement may open an access door or move the product to an accessible port or bin so that the customer can remove it.

Figure 2:
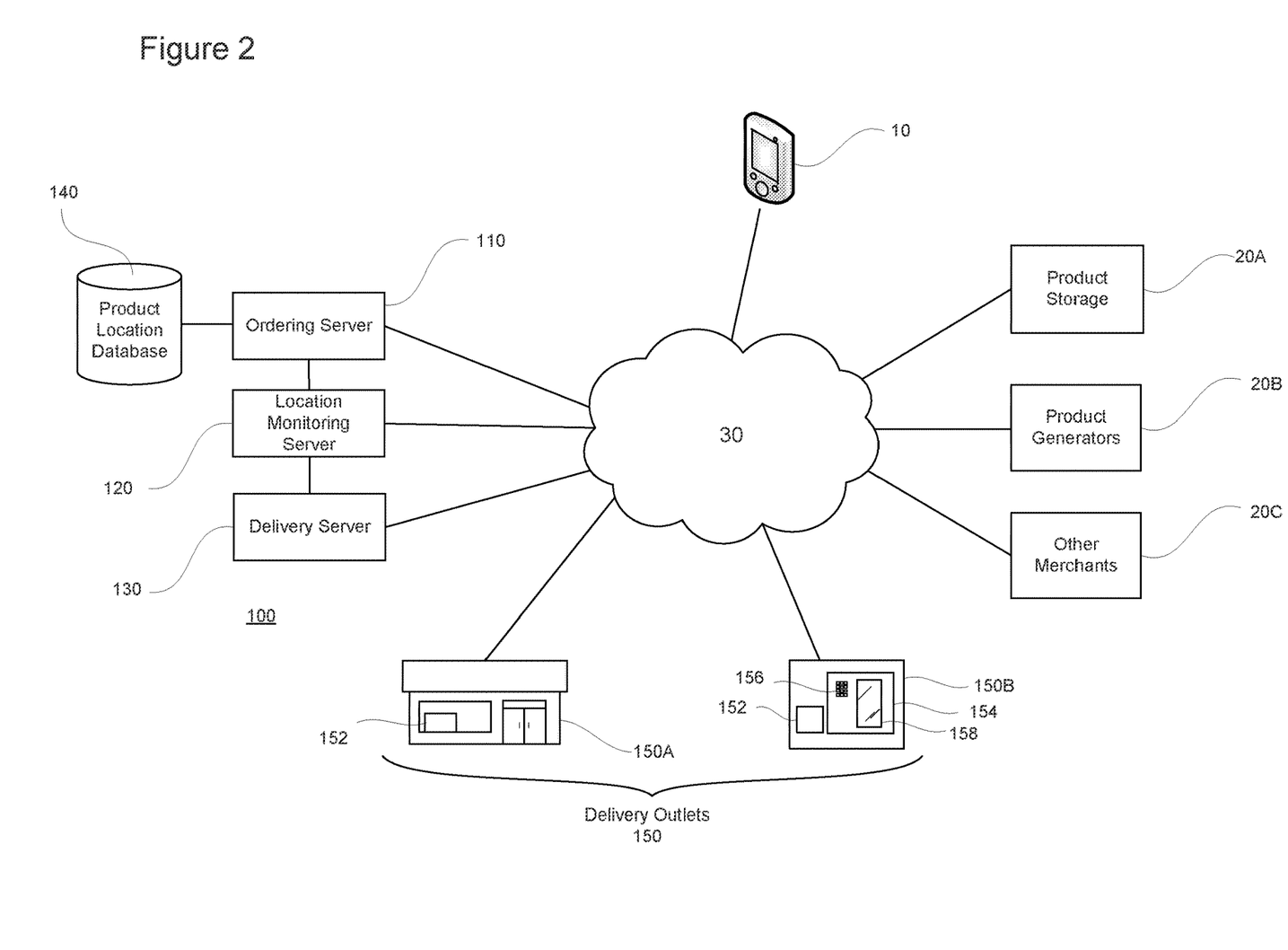
FIG. 2 is a schematic representation of a product delivery system according to an embodiment of the invention.

The methods of the invention can be implemented on or in conjunction with a product delivery system that incorporates data processing systems for facilitating certain ordering, monitoring and delivery functions of a merchant. As used herein, the term "merchant" refers to any entity that provides a deliverable product to a customer. FIG. 2 depicts a product delivery system 100 according to an embodiment of the invention. The system 100 may include various network-enabled computer systems, including, as depicted in FIG. 2 for example, an ordering server 110, a location monitoring server 120, a delivery server 130, and product location database 140. The system 100 also includes a plurality of delivery outlets 150. As will be discussed, the delivery outlets 150 may include retail stores, banks, and other walk-in establishments. They may also include automated kiosks and walk-up or drive-up machines similar to ATMS. All of these systems may be or comprise network-enabled processors and any or all may be capable of communication with one another via a network 30. In some embodiments, some components of the system 100 may communicate with one another via a second network in addition to or instead of the network 30.

As referred to herein, a network-enabled processor, computer system or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the methods contemplated by the invention may execute one or more software applications to, for example, receive data as input from an entity accessing the network-enabled computer system, process received data, transmit data over a network, and receive data over a network. The one or more network-enabled computer systems may also include one or more software applications to send notifications to an account holder or other user. It will be understood that the depiction in FIG. 2 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 2.

The ordering server 110 is a network-enabled computer system configured for communication via the network 30 and to receive a product order from a user device 10 associated with an account holder or other customer. For purposes of product ordering, the user device 10 may be any mobile or other processing device usable by a customer to communicate with the ordering server 10 via the network 30. The product order may be received as a separate, standalone order request (e.g., an email request) or may be made as part of an on-line interactive session between the user device 10 and the order processing server 110. In particular embodiments, the product order may be transmitted by the order processing server 110 using an ordering application resident on the user device 10. The product order includes information identifying the product. It may also include information identifying the user device, the customer, and/or a customer account. In some embodiments, the initial order may also include the location of the customer and/or a preferred delivery location. In some embodiments, the product order may also include payment or other transaction processing information.

The order processing server is configured to use the information in the product order to identify the ordered product and to determine availability and other product-related. The server may be configured to obtain inventory and location information for the product from the product availability database 140. The database 140 may also include detailed information on the product itself, such as size, weight, price, etc. Product availability information may include identification of all available product examples at various levels of the merchant's product delivery pipeline. The order processing server 110 may be configured to communicate with specific retail delivery outlets 150 (e.g., outlets within a predefined radius of the customer location) via the network 30 to obtain on-site product inventory information. The server may also be configured to communicate and check availability at other product sources such as storage facilities 20A, manufacturers or other product generators 20B, and even other merchants 20C.

The order processing server 110 may be further configured to use all product availability and other information to assemble a set of delivery time and location options. The potential delivery locations may include any or all of the delivery outlets 150 meeting predetermined criteria. These criteria may be based on proximity to the customer or to an area or location requested by the customer. They may also be based on availability of the product at the location or such other factors as cost or timing of shipping. In the case of some products (e.g., financial products), the criteria may include whether the location is capable of generating or preparing the product on-site. Delivery time windows may be determined for each possible delivery outlet 150. The order processing server 110 may be configured to determine an optimum delivery outlet 150 and time based on merchant criteria alone. Alternatively, the input or specified request of the ordering user may be used. In some embodiments, the order processing server may be configured to transmit a list of delivery options to the user via the network 30 and the user device 10 and to receive a selection response from the user.

Once the specific delivery outlet 150 and delivery time window have been determined, the order processing server 110 may communicate with the necessary entities to assure that the product is available for staging at the delivery location prior to the time window. If the product is not already at the delivery outlet 150, the order processing server 110 may need to communicate with another delivery outlet 150 or with one of the other product sources 20 to arrange for production and/or shipping of the product.

The location monitoring server 120 is a network-enabled device in communication with the ordering server 110 and configured to determine or estimate the location of the customer. In some embodiments, the location monitoring server 120 is configured to continuously or periodically receive location information from a mobile user device 10 having a location service application and to transmit this information to the delivery server 130. The location monitoring server 120 may also be configured to transmit a request to the user device 10 to activate the location service if it determines that the service is not active. Such a request may be transmitted at a particular time prior to the scheduled delivery time. If the location service is not activated or no service is available, the location monitoring server may transmit a request to the user for current location information.

The delivery server 130 is configured to use customer location information to estimate the customer's arrival time at the delivery outlet 150 or, in some cases, a specific location within the delivery location (e.g., a pick-up counter within a retail store). The delivery server 130 is in selective data communication with the ordering server 110, the location monitoring server 120, and the user device 10. The delivery server 130 is also in selective communication with product a delivery processor 152 at each delivery location outlet 150. The delivery server 130 may be configured to receive product order and scheduling information from the product ordering server 110 and user device location information from the location monitoring server 120. Using the location information, the delivery server 130 may determine and periodically update the estimated arrival time of the user at the selected delivery location 150. The delivery server 130 may also determine a confidence level in the estimate, the ETA and the confidence level collectively being ETA information. In some embodiments, the delivery server 130 may transmit the ETA information to the delivery processor 152 at the delivery location 150. In these embodiments, the delivery processor 152 may make a determination as to whether to initiate staging of the product. In other embodiments, the delivery server 130 may use the ETA information to make a staging initiation determination and, upon a determination to initiate staging, transmit a staging instruction to the delivery processor 152.

Delivery location outlets 150 may include walk-in outlets 150A such as retail stores, banks, pharmacies, etc. and self-service walk-up or drive-up outlets 150B. These outlets may be directly associated with the merchant. In some instances, the outlets may actually be associated with a distributor or another merchant. As noted above, each delivery outlet 150 has a delivery processor 152, which is a network-enabled processor or processing system in communication with the network 30. The delivery processor 152 is configured to receive information and/or instructions from the delivery server 130. In some embodiments, the delivery processor 152 may also communicate with the ordering processor 110 for exchange of order and product inventory information. The delivery processor 152 is configured to, based on instruction or information from the delivery server, initiate the staging of the product for delivery to the customer. In some embodiments, this may include alerting outlet personnel of the customer's ETA so that the product can be positioned for pick-up just before the customer's arrival. In applications at certain outlets (e.g., a bank or pharmacy), the outlet personnel may also be requested to produce or prepare the product. For example, a pharmacist may be alerted by the delivery processor 152 that a prescription must be prepared and staged for pick-up at the ETA. In some embodiments, rather than alerting personnel, the delivery processor 152 may cause the automated production or preparation of the product. The product may then be manually or automatically staged for pick-up.

The delivery outlets 150 of the system 100 may include a staging arrangement configured for positioning a product for viewing by and delivery to a customer. In walk-in outlets 150A, the staging arrangement may include a manual arrangement such as a manned counter where outlet personnel can present the product to the customer upon arrival. In some embodiments, a mechanized or partially automated arrangement such as a conveyer belt could be used to transfer the product to the pick-up point.

The self-service outlet 150B may be arranged so that a customer may view the ordered product immediately upon the customer's arrival. In some embodiments, the product is already presented in viewable when the customer arrives. The self-service outlet 150B may further be arranged to receive and verify customer identification information, and upon doing so, allow the customer to remove the product. To accomplish these actions, the self-service outlet 150B may have a staging arrangement 154 that is configured to present the product for delivery to the customer. The staging arrangement 154 may comprise one or more bays 158 the interiors of which are visible to the customer (e.g., through a window) and are sized according to the size of the product(s) to be received therein. In some embodiments, the bays 158 are essentially fixed and are manually loaded with the product(s) as nearly as possible to the customer's ETA. In other embodiments, a product may be automatically loaded into a fixed bay 158 just prior to or immediately upon the customer's arrival. In either case, each fixed bay may be provided with a door that can be automatically unlocked to give a customer access to the product inside.

In still other embodiments, the staging arrangement may include one or more bays 158 that are movable from a storage location to a presentation location in registration with a viewing window where the product may be viewed by the customer. The viewing window may be or may be incorporated into a door that can be automatically unlocked to provide access to the bay interior. In these embodiments, the product may be pre-staged by loading the product into one of the bays 158 at any time in advance of the customer's pick-up, which will then remain in its storage location until just before the customer's ETA.

The automated staging arrangement 154 may be in communication with the delivery processor 152 and may be configured to receive staging commands therefrom. In some embodiments, the delivery processor 152 may be incorporated into the staging arrangement 154. The automated staging arrangement 154 may also include a communication interface 156 for receiving information from a user of the arrangement 154. The communication interface 156 may include a physical interface such as a keyboard, touch screen, scanner, or card reader. In some embodiments, the communication interface 156 may include an NFC transmitter/receiver or other wireless communication interface configured to communicate with a mobile user device 10 or a chip-equipped account card.

The delivery processor 152 may be configured to receive, via the communication interface 156, customer identification or authorization information usable to verify authorization for product pick-up. In some embodiments, the delivery processor 152 may be configured to receive authorization information from more than one of the user input mechanisms described above. For example, the delivery processor 152 may receive primary authorization information via the user device 10 and secondary authorization information via keyboard entry of an order confirmation number. In some embodiments, the delivery processor 152 may be further configured to receive information necessary to complete a purchase transaction for the product. The delivery processor 152 may communicate the authorization and/or transaction information to the delivery server 130, the ordering server 110 or a dedicated security processor (not shown) for verification that the customer is authorized to receive the product. Upon receipt of authorization confirmation, the delivery processor 152 commands the staging arrangement to allow the customer access to the product.

Figure 3:
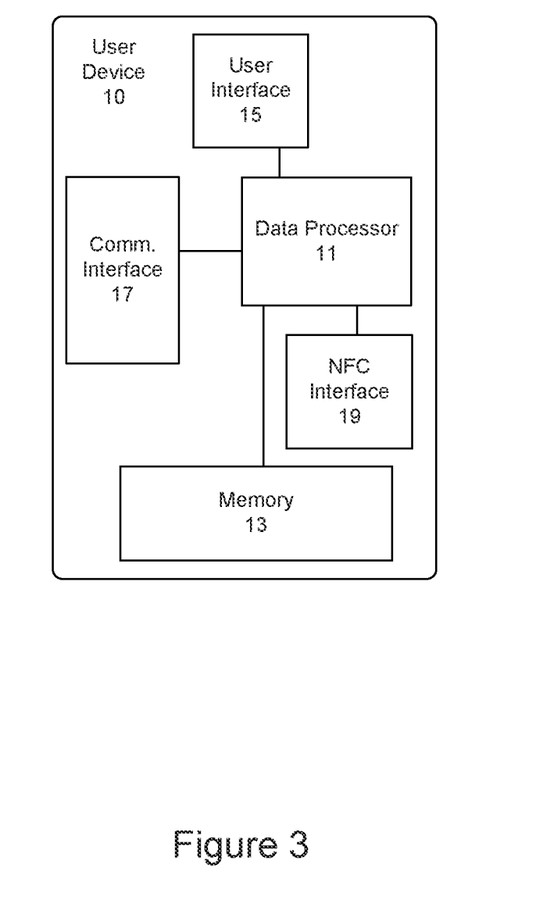
FIG. 3 is a schematic representation of a user interface device according to an embodiment of the invention.

With reference to FIG. 3, an account holder (or other user) processing device 10 may be any data processing and/or communication device that an account holder uses to carry out a transaction and/or to communicate with an application processing authority or the document storage and retrieval system 100 including, but not limited to a smartphone, a laptop, a desktop computer, and a tablet. In particular embodiments, the account holder device 10 includes an on-board data processor 11 in communication with a memory module 13, a user interface 15, and a communication interface 17. The data processor 11 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 13 can be a read-only memory, write-once read-multiple memory or read/write memory, e.g., RAM, ROM and EEPROM, and the user device 10 can include one or more of these memories.

The user interface 15 includes a user input device or mechanism 18, which can be any device for entering information and instructions into the account holder device 10, such as a touch-screen, keyboard, mouse, cursor-control device, microphone, stylus, or digital camera. The user interface 15 may also include a display 19, which can be any type of device for presenting visual information such as a computer monitor, a flat panel display, and a mobile device screen, including liquid crystal displays, light-emitting diode displays, plasma panels, and cathode ray tube displays.

The communication interface 17 is configured to establish and support wired or wireless data communication capability for connecting the device 10 to the network 30 or other communication network. The user device 10 may also include an NFC interface 17 that can be configured to support near field communication with a an NFC transmitter/receiver.

In embodiments of the invention, the memory 13 may have stored therein one or more applications usable by the data processor 11 to conduct and/or monitor transactions between the account holder device 10 and a merchant device or transaction processing system over the network 30. These applications may include instructions usable by the data processor 11 to identify transaction events, store event data in the memory 13, and communicate event data to a transaction processor. In certain embodiments, the memory 13 may have stored therein an application associated with a user account for facilitating the use of the product delivery system 100. This application may include instructions to receive user input from the user via the user interface 15 regarding a product to be ordered and delivery request information. The application further include instructions to construct and transmit a product delivery request to the product ordering server 110. The product delivery request may include information identifying the product, information identifying the user device, the customer, and/or a customer account, and product delivery information. The application may be further configured to instruct the data processor 11 to communicate with the ordering server 110 to provide additional delivery information. This may be accomplished through an interactive session with the ordering server 110 in which delivery options may be received from the ordering server 110 and presented to the user via the user interface 15. The application may include instructions to transmit to the ordering server 110 a selected delivery option including a delivery location and a delivery time interval. The application may be further configured for communication with the delivery server 130 and/or a delivery processor at the selected delivery location via the communication interface 17 and/or the NFC interface 19 to provide a user and/or user device validation request. The validation request may include authorization information for verification of the user's authorization to receive the ordered product. The application may be further configured to receive and display to the user a validation response.

The memory 13 may also have stored therein a location service application having instructions for the data processor 11 to generate device location information that can be used to determine the location of the user device 10. The application may further include instructions to transmit the location information to the location monitoring server 120 via the communication interface 17 and the network 30.

The present invention provides a significant improvement in the staging and delivery of electronically ordered products. It provides significant enhancements to customer convenience and product security by allowing secure pre-staging storage of a product until just prior to arrival of the customer to pick up the product.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A product delivery method comprising:
receiving, by an order processing server of a merchant from a user device associated with a user, a request for delivery of a product by the merchant, the request including a delivery location and a delivery time window;

providing the product to the delivery location by the merchant in advance of the delivery time window;

determining and periodically updating, by a delivery processing server, an estimated arrival time of the user at the delivery location;

placing the product into an automated staging arrangement at the delivery location, the automated staging arrangement having a secure storage bay that is sized to receive the product, that is selectively positionable for access to the product by the user, and that prevents release of the product to the user until access is authorized;

at the estimated arrival time, positioning the secure storage bay for viewing by the user at the delivery location, receiving, by the delivery processing server from at least one of the user device and a delivery location processing device, user validation information;

responsive to validation of the user validation information, transmitting, by the delivery processing server to the delivery location processing device, an instruction to allow access to the product by the user; and instructing the secure storage bay by the delivery location processing device to allow user access to and removal of the product from the secure storage bay.

2. A product delivery method according to claim 1 further comprising:

determining, by the order processing device, product availability at the desired delivery location;

determining, by the order processing device, product availability at alternative delivery locations within a predetermined radius of the desired delivery location;

determining, by the order processing device, one or more alternate product delivery options, each alternate delivery option including an alternate delivery location and an availability window;

transmitting, by the order processing server to the user device, the alternate product delivery options, and receiving, by the order processing server from the user device, a selected product delivery option including an updated delivery location and an updated delivery time window.

3. A product delivery method according to claim 2 wherein the actions of determining one or more alternate product delivery options, transmitting the alternate product delivery options, and receiving a selected product delivery option are carried out only upon determination of product unavailability at the desired delivery location.

4. A product delivery method according to claim 2 wherein the user device is located at a first user location when the request for delivery is received and the one or more alternate product delivery options are limited to merchant outlet locations within a predetermined radius of the first user location.

5. A product delivery method according to claim 1 further comprising:

transmitting, by the order processing server to the user device for presentation to the user, an instruction for the user to activate a location service application on the user device.

6. A product delivery method according to claim 5 wherein the action of transmitting an instruction to activate is carried out within a predetermined time interval before an opening of the delivery time window.

7. A product delivery method according to claim 5 wherein the action of transmitting an instruction to activate is carried out upon receiving the selected product delivery option.

8. A product delivery method according to claim 1 further comprising:

receiving at periodic intervals, by the delivery processing server, user device location information, wherein the action of determining and periodically updating is carried out using the device location information.

9. A product delivery system comprising:

a plurality of delivery location outlets associated with a merchant, each outlet having a product delivery arrangement comprising a delivery location processing device and a product delivery mechanism having a secure storage bay that is sized to receive an ordered-product, that is selectively positionable at an access site for access to the ordered product by an ordering-user, and that prevents release of the product to the user until access is authorized;

an ordering server in selective data communication with the product delivery arrangement of each delivery location outlet and a user device associated with a user, the ordering server being configured to receive from the user device a request for delivery of the ordered product of the merchant, the request for delivery including identification of the ordered product, a selected delivery location outlet, and a delivery time interval and transmit a product delivery order to the delivery location processing device of the selected delivery location outlet, the product delivery order including identification of the ordered product and a delivery time interval;

a location monitoring server configured to obtain location information for the user device and determine a time varying estimated location of the user device using the location information;

a delivery server in selective data communication with the ordering server, the location monitoring server, the delivery location processing device of each delivery location outlet, and the user device, the delivery server being configured to receive user device location information from the location monitoring server, determine and periodically update an estimated arrival time of the user at the selected delivery location, and transmit the estimated arrival time to the delivery location processing device of the selected delivery location outlet.

10. A product delivery system according to claim 9, wherein the secure storage bay comprises a lockable door having a viewing window positioned to allow the ordering user to view the ordered product therethrough when the secure storage bay is positioned at the access site.

11. A product delivery system according to claim 9 further comprising a product availability database having stored therein information on product availability for each delivery location outlet, wherein the ordering server is in selective data communication with the product availability database, and is further configured to determine a set of product delivery options, each option including a proposed delivery location outlet, obtain from the product availability database, product availability information for each proposed delivery location outlet transmit the product delivery options to the user device for display to the user, and receive from the user device a selected product delivery option including the selected delivery location outlet and the delivery time window.

12. A product delivery system according to claim 9 wherein the location monitoring server is in selective communication with the user device and the action to obtain location information for the user device includes receiving information from a location services application residing on the user device.

13. A product delivery arrangement configured for securely staging an ordered product for pickup by an ordering user at a merchant delivery location, the product delivery arrangement comprising:

a product delivery mechanism having a secure storage bay sized to receive the ordered product, the secure storage bay being selectively positionable at an access site at the merchant delivery location to allow viewing of the ordered product by the ordering user and being lockable to prevent release of the product to the user until access is authorized;

a user communication interface configured for communication with a user device of the ordering user; and a delivery location processing device in communication with the user communication interface and the product delivery mechanism, the delivery location processing device being configured to receive a product delivery order from an ordering server, the product delivery order including identification of the ordered product and a delivery time interval, receive, from a location monitoring server, an estimated arrival time at the merchant delivery location for the ordering user, instruct the product delivery arrangement to position the ordered product for viewing by the ordering user at the estimated arrival time, receive, from the user device via the user communication interface, a request to release the ordered product for pick up, the request including user device identification information, determine a user validation result using the user device identification information, and responsive to a positive user validation result, instruct the product delivery arrangement to release the ordered product for pickup by the ordering user.

14. A product delivery arrangement according to claim 13 wherein the delivery location processing device is further configured to, as part of the action to determine a validation result, transmit a validation request to a delivery processing server, the validation request including the user device identification information, and receive the user validation result from the delivery processing server.

15. A product delivery arrangement according to claim 13 wherein the user device is one of the set consisting of a mobile communication device and a chip-equipped account card, and wherein the user communication interface is configured for wireless communication with the user device.

* * * * *